United States Patent [19]

Nakata et al.

[11] Patent Number: 4,847,059

[45] Date of Patent: Jul. 11, 1989

[54] PROCESS FOR THE PRODUCTION OF SILICON TETRACHLORIDE

[75] Inventors: Yoshinori Nakata; Masaaki Suzuki; Takeshi Okutani, all of Sapporo, Japan

[73] Assignee: Director-General of Agency of Industrial Science and Technology, Japan

[21] Appl. No.: 215,817

[22] Filed: Jul. 6, 1988

[30] Foreign Application Priority Data

Jul. 29, 1987 [JP] Japan ............................ 62-191403

[51] Int. Cl.$^4$ ............................................. C01B 33/08
[52] U.S. Cl. ...................................... 423/341; 423/343
[58] Field of Search ................................ 423/341, 343

[56] References Cited

U.S. PATENT DOCUMENTS 4,082,833 4/1978 Wyndham et al. ................. 423/343
4,083,927 4/1978 Wyndham ............................ 423/341

Primary Examiner—John Doll
Assistant Examiner—Lori S. Freeman
Attorney, Agent, or Firm—Lorusso & Loud

[57] ABSTRACT

A silica-containing material such as silica sand, a carbonized biomass or biomass ash is converted into carbon tetrachloride by reaction with chlorine gas at an elevated temperature in the presence of a carbonaceous material such as coke, and sulfur or a sulfur compound. The reaction may be suitably performed in the further presence of a potassium compound.

10 Claims, No Drawings

PROCESS FOR THE PRODUCTION OF SILICON TETRACHLORIDE

This invention relates to a process for the production of silicon tetrachloride by chlorination of a silica-containing material.

Silicon tetrachloride which is an important raw material for the production of organosilicon compounds, silicone resins, fine particulate silica, high purity artificial quartz, silicon nitride, silicon carbide, etc. is generally prepared by the following three methods: (1) a method in which elemental silicon powder is chlorinated by reaction with HCl to produce trichlorosilane as a main product and silicon tetrachloride as a by-product; (2) a method in which ferrosilicon or silicon carbide is reacted with chlorine; and (3) a method in which a mixture of a silica-containing material such as silica stone and carbon is reacted with chlorine.

These conventional methods involve the following problems. The Method (1) in which silicon tetrachloride is produced as a by-product has a problem because the economy thereof depends on the demand for trichlorosilane produced as a major product. Further, elemental silicon is not available at low costs due to the consumption of much electrical energy for the production thereof which is generally performed by reduction of silica at a temperature of 2000° C. or more in an electric furnace. The Method (2) is also disadvantageous from the standpoint of economy since the raw material, i.e. ferrosilicon or silicon carbide is expensive because the production thereof requires much electrical energy. The Method (3) has a problem because the reactivity of a silica-carbon mixture with chlorine is low and requires a high reaction temperature, though the raw materials are easily available at a low price.

The present invention has been made with the foregoing problems of the conventional methods in view and has as its object the provision of an improved method which can produce silicon tetrachloride with a high yield using a silica-containing material such as silica stone as a raw material.

In accordance with the present invention, there is provided a process for the production of silicon tetrachloride, comprising reacting a silica-containing material with chlorine in the presence of a carbonaceous material and sulfur or a sulfur compound.

The silica-containing material to be used as a raw material in the process of the present invention may be, for example, silica sand, silica stone or combustion residues (ash) or carbonized materials or a biomass. The biomass is a silica-containing plant and may be, for example, leaves, stalks, straw, chaff of various plants. Illustrative of suitable biomass are wheat chaff, rice hull, straw of wheat and rice plant, and leaves and stalks of corn, sugar cane, bamboo and rush.

The biomass combustion residues may be obtained by combusting the biomass at a temperature of 500°–1100° C., preferably 600°–900° C. Since the silica in the ash obtained at a high temperature combustion tends to form crystals and since the reactivity of silica is lowered when it forms crystals, the combustion is desirably performed at a temperature below 900° C. The carbonized biomass to be used as the silica-containing material in the process of the present invention may be obtained by carbonizing the biomass at a temperature of 300°–1200° C., preferably 600°–1000° C. in an inert atmosphere such as in the atmosphere of nitrogen, argon or helium.

The silica contained in the silica-containing material is preferably amorphous though cystalline silica such as cristobalite, tridymite or quartz may be used.

In the present invention, the chlorination of the silica-containing material is performed in the presence of a carbonaceous material and sulfur or a sulfur-containing compound.

The carbonaceous material to be used in the present invention may be, for example, pitch, coke, carbon black, activated carbon or a carbonized biomass and may be in the form of a liquid or solid. When a silica-containing, carbonized biomass is used as the silica-containing material, the carbonaceous material may be omitted. The carbonaceous material is preferably used in such an amount as to provide a weight ratio of $SiO_2$ to carbon of about 10:1 to 1:1, more preferably 2.5:1 to 1.5:1.

The sulfur compound may be, for example, carbon disulfide, hydrogen sulfide or sulfur dioxide and may be in the form of a gas, liquid or solid. Of these, the use of carbon disulfide is preferred. Since, carbon disulfide can provide carbon necessary in the chlorination of silica, the carbonaceous material may be omitted or the amount thereof may be decreased when the chlorination of the silica-containing material is performed in the presence of carbon disulfide. The amount of sulfur or the sulfur compound is 1:1000 to 1:1, preferably 1:1000 to 1:2 in terms of the weight ratio thereof to the chlorine fed for the chlorination to the reaction zone.

It is preferred that the chlorination be performed in the additional presence of potassium compound so as to further improve the yield of silicon tetrachloride. Examples of the potassium compounds include potassium carbonate, potassium chloride, potassium hydrogensulfate, potassium hydroxide, potassium nitrate and potassium sulfate. The potassium compound may be in the form of a solid or liquid. The potassium compound is preferably used in an amount of 0.05–50 weight %, more preferably 0.1–10 weight % based on the weight of silica in the silica-containing material.

The chlorination of the silica-containing material is performed at a temperature of 400°–1100° C., preferably 600°–1000° C. and may be performed in various manners. For example, the carbonaceous material, the sulfur or sulfur compound and the potassium compound (which is an optional ingredient) may be mixed with the slica-containing material prior to the commencement of the chlorination. It is preferred that the mixture be well commingled by means of, for example, a ball mill prior to the chlorination for reasons of improved conversion of the silica-containing material. In a preferred embodiment according to the present invention, the above mixture is pulverized so that the particle sizes of the silica-containing material and the carbonaceous material are, for example, about 10 μm or less and about 50 μm or less, respectively, more preferably about 4 μm or less and 15 μm or less, respectively. The mixture which may be in the form of powder or may be shaped into pellets is supported in the form of a bed in a reaction zone to which a chlorine-containing gas which may be a pure chlorine gas or a chlorine gas diluted with nitrogen or the like inert gas is fed for contact with the bed. The bed may be a fixed bed or a fluidized bed. This method may be adopted even when one or more of the carbonaceous material, the sulfur or sulfur compound, and the potassium compound are liquid. Chlorine is generally used at least in a stoichiometric amount.

When the sulfur or sulfur compound is in a gaseous form, it may be supplied to the reaction zone simultaneously with the chlorine-containing gas for contacting with the bed of a mixture of the silica-containing material, carbonaceous material and, optionally, potassium compound. The sulfur or sulfur compound even when it is in the form of a liquid or a solid may also be fed to the reaction zone simultaneously with the chlorine-containing gas using a liquid pump or powder feeder.

The gas discharged from the reaction zone and containing unreacted chlorine and silicon tetrachloride is fed to a separator where the silicon tetrachloride is separated, for example, by condensation. The gas from which silicon tetrachloride is separated may be recycled to the reaction zone, if desired.

The following examples will further illustrate the present invention. In the examples, combustion residues of rice hull, a carbonized product from rice hull and natural silica sand were used as silica-containing raw materials.

The combustion residues of rice hull were those obtained by combusting rice hull in a furnace at a temperature in the range of 800°–1000 °C. at an excess air ratio with a rice hull feed rate of 450 kg/hr and with a residence time of 4 hours. The rice hull residues (ash) were found to contain 96.5% by weight of $SiO_2$ and 2.1 % by weight of residual carbon.

The carbonized rice hull was that obtained by heating rice hull (20 g), packed in a quartz glass tube with an inside diameter of 55 mm, at 700 °C. for 1 hour under a nitrogen stream supplied at a rate of 2 liter/minute. The carbonized product was found to contain 47.4% by wight of $SiO_2$ and the balance of essentially carbon.

The natural silica sand contained 97.7% by weight of $SiO_2$.

The $SiO_2$ content herein was analyzed after treating the sample with nitric acid and perchloric acid. The carbon content was determined by ignition loss by thorough combustion in air.

Oil coke (petroleum oil coke) having the following analytical values or the above-mentioned carbonized rice hull was used as carbonaceous material.

| Proximate analysis (equilibrated sample) | |
|---|---|
| Moisture content | 0.5% by weight |
| Ash content | 0.1 |
| Volatile matter content | 6.3 |
| Fixed carbon content | 93.1 |
| Elementary analysis (water- and ash-free sample) | |
| C | 95.1% by weight |
| H | 3.7 |
| N | 0.6 |
| O | 0.2 |
| S | 0.5 |

The silica-containing materials and the carbonaceous materials were each ground for 5 minutes with a planetary ball mill having an inside volume of 12 ml.

EXAMPLES 1–8

A quantity of the silica-containing material as shown in Table 1 was mixed with a quantity of the carbonaceous material as shown in Table 1 to obtain a mixture having a weight ratio of $SiO_2$ to C of 2:1. The mixing was performed with a planetary ball mill for 1 minute (Examples 1–3) or 10 minutes Examples 4–8). Each mixture (or carbonized rice hull in Example 6) was then subjected to chlorination in the presence of sulfur (Example 5) or $CS_2$ (Examples 1–4 and 6–8). Thus, the above mixture (1g) was put in a boat made of alumina and this boat was set in the center of a quartz glass reaction tube with an inside diameter of 30 mm. The quartz glass tube supporting the mixture-containing boat therein was heated to 900° C. at a heating rate of 26° C./minute in an argon gas stream flowing at a rate of 100 ml/minute through the reaction tube. After maintaining the reaction tube at 900° C. for 30 minutes, the feed of argon gas was stopped and chlorine gas was fed at a rate of 100 ml/minute for 1 hour while maintaining the reaction tube at 900° C. Simultaneously with the feed of the chlorine gas, $CS_2$ was also introduced into the reaction tube by means of a liquid pump at a feed rate as shown in Table 1, in which the amount of the $CS_2$ is given as percentage based on the weight of the chlorine feed and calculated on elemental sulfur basis. In Example 5, in which elemental sulfur was used in place of $CS_2$, the reaction tube was set in a vertical position and the sulfur was supplied by means of a powder feeder.

The downstream of the reaction tube was connected to a condenser (methanol-dry ice trap) so that the gas discharged from the reaction tube was cooled for the recovery of silicon tetrachloride. After the termination of the chlorination, the reaction mixture remaining in the alumina boat was allowed to be cooled to room temperature while feeding argon and then analyzed for determining the conversion of $SiO_2$ into $SiCl_4$. The conversion was determined from the contents of $SiO_2$ before and after the chlorination. The results are summarized in Table 1.

COMPARATIVE EXAMPLES 1–4

Examples 1 and 6–8 were each repeated in the same manner as described except that $CS_2$ was not supplied to the reaction tube. The results are also shown in Table 1. From the results shown in Table 1, it will be appreciated that the addition of sulfur or $CS_2$ improves the conversion.

TABLE 1

| Example No. | Silica-containing raw material | Carbonaceous material | Sulfur or Sulfur-containing material (amount of S based on weight of $Cl_2$) | Conversion (%) |
|---|---|---|---|---|
| 1 | hull ash | coke | $CS_2$ (50%) | 58.9 |
| 2 | hull ash | coke | $CS_2$ (30%) | 56.4 |
| 3 | hull ash | coke | $CS_2$ (10%) | 42.0 |
| 4 | hull ash | coke | $CS_2$ (10%) | 59.1 |
| 5 | hull ash | coke | S (10%) | 57.8 |
| Comp. 1 | hull ash | coke | — (0) | 31.5 |
| 6 | carbonized hull | — | $CS_2$ (10%) | 90.5 |
| Comp. 2 | carbonized hull | — | — (0) | 81.0 |
| 7 | silica sand | coke | $CS_2$ (10%) | 15.7 |
| Comp. 3 | silica sand | coke | — (0) | 6.8 |
| 8 | hull ash | carbonized | $CS_2$ (10%) | 93.1 |

TABLE 1-continued

| Example No. | Silica-containing raw material | Carbonaceous material | Sulfur or Sulfur-containing material (amount of S based on weight of Cl$_2$) | Conversion (%) |
|---|---|---|---|---|
| Comp. 4 | hull ash | hull carbonized hull | — (0) | 66.8 |

EXAMPLES 9–14

Example 4 was repeated in the same manner as described except that each of the potassium compounds shown in Table 2 was further incorporated into the mixture of the rice hull ash and the coke in an amount of 10% based on the weight of the SiO$_2$ contained in the rice hull ash. The results were as shown in Table 2 together with the result of Example 4.

EXAMPLE 15

Example 6 was repeated in the same manner as described except that potassium hydrogensulfate was mixed with the carbonized rice hull in an amount of 10% based on the weight of the SiO$_2$ contained in the carbonized rice hull. The result is shown in Table 2 together with that of Example 6.

EXAMPLE 16

Example 7 was repeated in the same manner as described except that potassium hydrogensulfate was further incorporated into the mixture of the natural silica sand and the oil coke in an amount of 10% based on the weight of the SiO$_2$ contained in the silica sand. The results were as shown in Table 2 together with the result of Example 7.

TABLE 2

| Example | Silica-containing material | Carbonaceous material | Potassium compound | Conversion (%) |
|---|---|---|---|---|
| 4 | hull ash | coke | — | 59.1 |
| 9 | hull ash | coke | KHSO$_4$ | 93.3 |
| 10 | hull ash | coke | KCl | 95.1 |
| 11 | hull ash | coke | K$_2$CO$_3$ | 88.0 |
| 12 | hull ash | coke | KOH | 91.9 |
| 13 | hull ash | coke | KNO$_3$ | 89.0 |
| 14 | hull ash | coke | K$_2$SO$_4$ | 91.7 |
| 6 | carbonized hull | — | — | 90.5 |
| 15 | carbonized hull | — | KHSO$_4$ | 97.7 |
| 7 | silica sand | coke | — | 15.7 |
| 16 | silica sand | coke | KHSO$_4$ | 25.9 |

From the results shown in Table 2, it will be apparent that the addition of a potassium compound improves the conversion.

EXAMPLES 17–21

Example 9 was repeated in the same manner as described except that the amount of the coke in the mixture was varied to provide a SiO$_2$/C weight ratio as shown in Table 3 and that the mixing time was changed from 10 minutes to 1 minute. In Example 21, no coke was used. The results are shown in Table 3.

EXAMPLES 22 AND 23

Example 21 was repeated in the same manner as described except that the feed rate of the CS$_2$ was increased as shown in Table 3. The results are shown in Table 3.

COMPARATIVE EXAMPLE 5

Example 21 was repeated in the same manner as described except that the CS$_2$ was not supplied. The result was as shown in Table 3.

TABLE 3

| Example | SiO$_2$:C ratio | Amount of S based on weight of Cl$_2$ (%) | Conversion (%) |
|---|---|---|---|
| 17 | 2:1 | 10 | 78.8 |
| 18 | 4:1 | 10 | 70.7 |
| 19 | 8:1 | 10 | 59.1 |
| 20 | 20:1 | 10 | 48.6 |
| 21 | 1:0 | 10 | 35.6 |
| 22 | 1:0 | 30 | 58.7 |
| 23 | 1:0 | 50 | 67.0 |
| Comp. 5 | 1:0 | 0 | 4.6 |

From the results shown above, it will be seen that the conversion becomes higher as the amount of the coke is increased. Even if no coke is used, the conversion can be improved by increasing the amount of CS$_2$.

What is claimed is:

1. A process for the production of silicon tetrachloride, comprising reacting a silica-containing material with chlorine in the presence of (a) a carbonaceous material (b) sulfur or carbon disulfide and (c) a potassium compound selected from the group consisting of potassium carbonate, potassium chloride, potassium hydroxide and potassium nitrate.

2. A process as claimed in claim 1, wherein said reaction is performed at a temperature of 400° to 1000° C.

3. A process as claimed in claim 1, wherein said carbonaceous material is used in an amount providing a SiO$_2$/C weight ratio of 10:1 to 1:1.

4. A process as claimed in claim 1, wherein the reaction is performed with a weight ratio of the sulfur or carbon disulfide to the chlorine of 1:1000 to 1:1.

5. A process as claimed in claim 1, wherein said chlorine is used at least in a stoichiometric amount.

6. A process as claimed in claim 1, wherein said carbonacous material is pitch, coke, carbon or a carbonized biomass.

7. A process as claimed in claim 1, wherein said silica-containing material is silica sand, silica stone, a carbonized biomass or combustion residues of a biomass.

8. A process as claimed in claim 1, wherein the silica of said silica-containing material is in the form of amorphous cristobalite, tridymite or quartz.

9. A process as claimed in claim 1, wherein said potassium compound is used in an amount of 0.1–50% by weight based on the weight of the silica contained in said silica-containing material.

10. A process for the production of silicon tetrachloride, comprising reacting a silica-containing material with chlorine in the presence of carbon disulfide and a potassium compound selected from the group consisting of potassium carbonate, potassium chloride, potassium hydrogensulfate, potassium hydroxide, potassium nitrate and potassium sulfate.

* * * * *